United States Patent
Siemssen et al.

(10) Patent No.: US 8,540,784 B2
(45) Date of Patent: Sep. 24, 2013

(54) FUEL COMPOSITIONS

(75) Inventors: Brent Siemssen, Tacoma, WA (US); Joel Edmonds, Stanwood, WA (US)

(73) Assignee: Tellus Renewables LLC, Stanwood, WA (US)

(*) Notice: Subject to any disclaimer, the term of this patent is extended or adjusted under 35 U.S.C. 154(b) by 296 days.

(21) Appl. No.: 12/766,801

(22) Filed: Apr. 23, 2010

(65) Prior Publication Data
US 2011/0258910 A1 Oct. 27, 2011

(51) Int. Cl.
*C10L 1/00* (2006.01)
*C10L 1/22* (2006.01)

(52) U.S. Cl.
USPC .................. 44/307; 44/324; 44/439; 44/451; 44/425

(58) Field of Classification Search
USPC .............................. 44/307, 324, 439, 451, 425
See application file for complete search history.

(56) References Cited

U.S. PATENT DOCUMENTS

| | | | |
|---|---|---|---|
| 4,300,912 A | 11/1981 | Townsend | |
| 6,090,169 A | 7/2000 | Krull et al. | |
| 6,277,158 B1 | 8/2001 | McLean | |
| 6,514,298 B2 | 2/2003 | Haji et al. | |
| 6,979,426 B2 | 12/2005 | Teall et al. | |
| 7,648,539 B2 * | 1/2010 | Wetzel | 44/308 |
| 2003/0172584 A1 | 9/2003 | Henly et al. | |
| 2004/0060229 A1 | 4/2004 | Todd et al. | |
| 2005/0016060 A1 | 1/2005 | Krull et al. | |
| 2005/0108924 A1 | 5/2005 | Krull | |
| 2005/0166447 A1 | 8/2005 | Corkwell et al. | |
| 2006/0037237 A1 | 2/2006 | Copeland et al. | |
| 2006/0236598 A1 | 10/2006 | Selvidge | |
| 2007/0113467 A1 | 5/2007 | Abou-Nemeh | |
| 2010/0083564 A1 | 4/2010 | Wetzel | |

FOREIGN PATENT DOCUMENTS

| | | |
|---|---|---|
| RU | 2167920 C2 | 10/2000 |
| UA | 42604 A | 10/2001 |
| UA | 13695 U | 4/2006 |

OTHER PUBLICATIONS

International search report dated Jun. 22, 2007 for PCT Application No. US2006/045274.

* cited by examiner

*Primary Examiner* — Cephia D Toomer
(74) *Attorney, Agent, or Firm* — Wilson Sonsini Goodrich & Rosati

(57) ABSTRACT

The present invention provides hybrid diesel fuels and methods for manufacturing hybrid diesel fuels. In embodiments, fuel compositions comprise at least one petrochemical fuel, at least one biosynthetic oil and at least one stabilizer mixture. The percentage by volume of the petrochemical fuel can be greater than 0% and less than 100%, and the percentage by volume of the stabilizer mixture can be between about 0.001% and about 0.5%.

24 Claims, 2 Drawing Sheets

| Properties /Contents | Unit | Limiting Value | | Testing Method |
|---|---|---|---|---|
| | | Min | Max. | |
| Density (15°C) | kg/m$^3$ | 870 | 930 | ASTM D-4052<br><br>DIN EN ISO 3675<br>DIN EN ISO 12185 |
| Insolubles | % (wt/wt) | - | 0.15 | AOCS Ca 3a-46 |
| Acid Value | mg KOH/g | - | 1.7 | ASTM D-664<br><br>DIN EN ISO 660 |
| Phosphorus Content | mg/kg | - | 30 | ASTM D-3231-99 |
| Water Content | % (wt/wt) | - | 0.15 | ASTM D-1744<br><br>pr EN ISO 12937 |
| Waxes and Gums | %(vol/vol) | | 1.0 | |
| Sodium + Potassium | ppm | | 5 | EN 14538 |
| Ca + Mg Combined | ppm | | 5 | EN 14538 |
| Ash Content | Mass (%) | | .01 | EN 6245 |

FIG. 2

FUEL COMPOSITIONS

FIELD OF THE INVENTION

The invention relates to fuel compositions, and, more particularly, to fuel compositions having biosynthetic oils.

BACKGROUND OF THE INVENTION

Because of dwindling supplies of mineral hydrocarbon fuels, urgent social and economic needs exist for alternative fuels derived from renewable sources. Natural, biosynthetic oils, including virgin oils, typically those obtained from plant seeds or from other vegetable components or vegetable waste materials, represent a practical solution to the fuel supply problem. These natural fuels, except for processing and shipping expenditures, do not impact the availability of petrochemical fossil fuels.

Furthermore, with concerns of global warming, vegetable oil fuels are themselves carbon-neutral and upon combustion do not substantially increase the concentration of a green house gas or carbon dioxide, in the atmosphere. Vegetable oils are ultimately produced photosynthetically, utilizing atmospheric carbon dioxide as a carbon source. Hence, combustion of these oils essentially recycles carbon into the environment and does not increase the overall carbon burden. For practical purposes, it is critical, of course, that vegetable oil fuels are renewable, in contrast to petroleum fuels, which are in limited geological supply.

Waste vegetable oil (WVO) is an energy-rich resource obtained in large quantities as a byproduct from the food preparation industry, which employs vegetable oils as frying agents. One such common WVO is known, for instance, as yellow grease (YG) because of the color it develops upon use as a fry medium. Other spent frying oils or fats, such as beef tallow, derived from beef fat, and lard, derived from pork fat, are also potential fuels because of their high energy content. WVO, YG, lard, and spent tallow require recycling or further utilization to prevent build-up and environmental contamination. An increasingly attractive, economical usage for these waste products is as a fuel feedstock.

Biodiesel, already in active commerce, is one example of an alternative fuel utilizing vegetable oils, including WVO as a feedstock. Biodiesel is a renewable fuel produced by the transesterification of vegetable oils with a basic catalyst to produce combustible methyl and ethyl fatty acid esters. These esters are then separated from the reaction mixture to provide clean, energy-rich diesel fuel materials.

Typically, biodiesel fuels are blended with petroleum-based diesel fuels, such as Diesel Number 1 or Diesel Number 2, to produce hybrid fuels with acceptable performance and storage qualities (generic quality standards for diesel fuels are set by the American Society for Testing and Materials, ASTM; for diesel fuels that standard is ASTM D975). For example B20 is a hybrid biodiesel diesel fuel produced by blending 20% biodiesel with 80% petrochemical diesel by volume. Analogously, B50 biodiesel contains 50% biodiesel by volume.

B20 is a highly desirable diesel fuel, recently becoming more available commercially, with good cetane rating and other favorable characteristics. B20 contains less sulfur than Diesel Number 2, because the biofuel component is essentially sulfur free, and therefore B20 and other biodiesel hybrid mixtures burn more cleanly than Diesel Number 2 itself. B20 meets ASTM standard D6751, established specifically for biodiesel fuel quality and performance.

There are, nonetheless, drawbacks to biodiesel fuels. It is well recognized that the alcoholic components used in the manufacture of biodiesel, particularly methanol, are toxic and require special handling. These alcoholic components are volatile and highly flammable, and can be explosive. The reaction catalyst base, frequently sodium hydroxide, is also a highly corrosive and injurious substance that requires special containment and careful disposal. Glycerol, a relatively non-toxic byproduct of the transesterification reaction, requires storage and disposal. In addition, sludge and other deposits are formed in internal combustion engine systems that cause abnormal rise in carbon monoxide, unburned hydrocarbon concentrations in the exhausted gases, changes and delays in fuel flow. These result in deteriorated running performance, premature engine wear, and exhaust gas.

The current invention is a response to these and other deficiencies.

SUMMARY OF THE INVENTION

The present invention generally relates to the field of engine fuels. In some embodiments, the present invention relates to a composition of blended engine fuel made from petroleum diesel fuel or biofuels in combined with vegetable or animal oils, and further modified with an admixture (or mixture) of stabilizing chemical agents. The resultant hybrid fuel is particularly suitable for applications powered by diesel engines, but is additionally useful for other fueling and heating applications. The invention is further suitable as an internal mechanical lubricant. The present invention also pertains to the methods for producing this hybrid fuel.

In some embodiments, the invention provides a hybrid fuel mixture of at least one biosynthetic oil (e.g. vegetable and/or animal oils) extended in composition. In some embodiments, the vegetable and animal oils are waste oils. In some embodiments to provide acceptable fuel characteristics, the hybrid fuel is further blended with a small amount of one or more chemical modifiers, referred to collectively as "stabilizer".

In some embodiments, the hybrid fuel mixture has excellent lubricity properties. The hybrid fuel is less expensive to produce than biodiesel and its production produces a minimum of environmentally unattractive by-products. In various embodiments, compositions and methods of manufacture of the hybrid fuel and lubricant are provided.

In some embodiments, the present invention provides a hybrid diesel fuel that is obtainable from waste and/or virgin vegetable and animal sources and incorporating of petrochemical diesel feedstock.

In some embodiments, the invention provides a fuel that can be utilized in standard diesel engines, without further modification of the engines. As such, the fuel should meet ASTM D6751, ASTM D7467, and ASTM D975, a set of standards that govern the qualities of biofuels for use in diesel engines.

In some embodiments, the invention provides a fuel that is less polluting than commercial diesel fuels in engine or burner use.

In some embodiments, the invention provides a mechanical lubricant for diesel engines derived substantially from waste biosynthetic oils of plant or animal origin.

In some embodiments, the invention provides a more environmentally friendly and lower cost alternative to diesel and biodiesel fuels.

In some embodiments, the invention provides mixtures of commercial diesel fuels in the range of greater than zero and less than 100% and at least one biosynthetic oil of up to 99.99% by volume, and up to 1% of a stabilizer mixture. In some embodiments, a mixture of commercial diesel fuel of about 95% and at least one biosynthetic oil of about 4.5 to 5% is provided.

These mixtures mix well and burn efficiently in diesel engines. When tested, there is neither significant loss of engine power or engine torque, nor is there abnormal engine wear, compared to Diesel Number 2. Partly because of lower sulfur content, the hybrid fuel is less polluting than petroleum diesel fuels. The hybrid mixtures can function under extreme weather conditions.

In some embodiments, the pre-mixture resulting from the simple blending of the commercial diesel fuels and biosynthetic oil is conditioned with one or more additional components, collectively called the "stabilizer". In part, the stabilizer, added in small measure, allows the mixture of petroleum diesel fuel and biosynthetic oil to reach the same lubricity, pour, and flow rate as commercial diesel fuels. Additionally, the stabilizer maintains cetane requirement of the fuel, cleans oil solids from injector ports, lubricates diesel engine parts, demulsifies aqueous contamination, protects against fuel gelling, and reduces sulfur emissions (when compared to the petrochemical diesel component of the hybrid fuel).

In some embodiments, the invention provides a fuel composition for diesel engines containing at least one petrochemical fuel; at least one biosynthetic oil; and, at least one stabilizer mixture, where the percentage by volume of said petrochemical fuel is greater than about 0% and less than 100%, and where the percentage by volume of said stabilizer mixture is about 0.001% to about 1.0%. In some embodiments, the invention provide a mixture of commercial diesel fuel of about 95%, at least one biosynthetic oil of about 4.5 to 5%, and where the percentage by volume of said stabilizer mixture is about 0.001% to about 0.5%.

In some embodiments, the stabilizer mixture comprises components selected from the group consisting of at least one additive configured to maintain cetane levels at or above petroleum fuel requirements for Diesel Number 2 fuel; at least one additive configured to maintain and clean oil solids from injectors and fuel systems; at least one additive configured to maintain lubrication of said internal combustion engines and their parts; at least one additive configured to remove or separate water from said at least one fuel and said fuel composition; at least one additive configured to prevent gelling of said fuel composition; and, at least one additive configured to prevent oxidation of said fuel composition. In some embodiments, the stabilizer mixture components comprise at least one additive configured to prevent oxidation of said fuel composition; at least one additive to act as a metal deactivator.

In some embodiments, the stabilizer mixture can comprise cetane enhancers, demulsifiers, detergent, lubricants, antioxidants, metal deactivators and antigellants. In some embodiments, the stabilizer mixture comprises, by volume, about 2% to about 30% of one or more cetane enhancers, about 1% to about 5% of one or more antigellants, about 1% to about 3% polydentate metal deactivators, about 1% to about 30% antioxidants, about 1% to about 5% oil/diesel bonder, about 1% to about 20% M.I.U./paraffin bonder, about 1% to about 10% carbon reducer, about 1% to about 10% soap/glycerin releasing agent, about 1% to about 30% stabilizer.

In some embodiments, the stabilizer mixture comprises, by volume: acetone, about 2% to about 7%; 3-butyl-3-methylnitrate propane, about 32% to 55%; sorbitan mono-9-octadecenol, about 1% to about 6%; sorbitan tri-9octadecenol, about 1% to 6%; 1-hydroxy-3,6-dioxaoctane, about 0.1% to 9%; long-chain alkyl benzenes, about 8% to 19%; 2-butoxyethanol, about 4% to 13%; 2-butylbutanol, about 0.25% to 5%; heavy aromatic naphthas, about 4% to 17%; 1-methylbenzene, about 0.3% to 6%; dimethyl benzenes, zero up to about 13%; methyldipropylene glycol, about 11% to 24%; methyldipropylene propanol, less than about 1% to 26%; alkylalkyloxy alkanol, about 0.1% to about 24%; 2-ethylhexl-nitrate, about 18% to 45%; octyl nitrate, about 2% to 15%; xlene heptane, about 5% to 15%; 2-ethylhexanol, less than about 1% to 3%; one or more antioxidants, such as BHT and BHA, about 1% to 5%; one or more polydentate metal deactivators, such as N,N'-di-sec-butyl-p-phenylenediamine and N,N'-disalicylidene-1,2,diaminopropane, less than about 1%.

In some embodiments, the fuel composition meets quality standards ASTM D975, ASTM D7467, and ASTM D6751. In some embodiments, the biosynthetic oil is up to 99.99% by volume of the fuel composition. In some embodiments, the biosynthetic oil is about 5 to about 10% by volume of the of the fuel composition.

In some embodiments, the invention provides a fuel composition containing greater than zero % volume of at least one petroleum fuel; about 99.9% volume of at least one biosynthetic oil; and, about 0.001% to 1.0% by volume of a stabilizer mixture configured to enable the fuel composition to reach the same or higher lubricity, pour rate, and flow rate as Diesel Number 2 fuel. In some embodiments, the invention provides a fuel composition containing greater about 90% to about 95% of one petroleum fuel; about 5 to about 10% by volume of at least one biosynthetic oil; and about 0.001% to 0.5% by volume of a stabilizer mixture configured to enable the fuel composition to reach the same or higher lubricity, pour rate, and flow rate as Diesel Number 2 fuel.

In some embodiments, the biosynthetic oil is at least one recycled vegetable oil. In some embodiments, the biosynthetic oil includes at least one type of recycled animal oil.

In some embodiments, the biosynthetic oil is selected from the group consisting of peanut oil, vegetable shortening, cottonseed oil, soy oil, rapeseed oil, canola oil, palm oil, waste vegetable oil, tallow, lard, and yellow grease, brown grease, jatropha oil, copra oil, coconut oil, camelina oil, tallow, lard, and yellow grease.

The petrochemical diesel component can be Diesel Number 1, Diesel Number 2, Farm Diesel or any diesel fuel meant for use in diesel engines. These petroleum fuels can be used singly, or as desired, in any combination.

Diesel fuel functions as a lubricity agent for the working parts of a diesel engine that come in contact with the fuel. In some embodiments, in addition to being a fuel, the invention also co-functions as an improved lubricant, when compared to Ultra Low Sulfur Diesel Number 2. One benefit is that it reduces the knock or "gap time" in a diesel engine.

To adjust for the availability of vegetable and animal waste oils, most recognized, commercial waste oils can be used in the hybrid mixture, singly or in any combination. The biosynthetic oils can be fresh or virgin. In some embodiments, the vegetable or animal oil is recycled. In some embodiments, the oils are filtered and polished via the method known in the art including those described herein.

In some embodiments, the fuel compositions of the invention further prevent the loss of horsepower and torque of the diesel engine compared to Diesel Number 2 fuel or Diesel Number 1. In some embodiments, the fuel compositions of the invention further prevent abnormal wear of engines compared to Diesel Number 2 fuel or diesel Number 1. In some embodiments, the fuel compositions of the invention further reduce sulfur emissions of the diesel engines compared to Diesel Number 2 fuel or diesel Number 1. In some embodiments, the fuel compositions of the invention lubricate the engines and their related working parts equally or better than Diesel Number 2 fuel or Diesel Number 1 fuel.

In an aspect of the invention, a method for forming a fuel composition is provided. In embodiments, the method comprises: (a) heating a biosynthetic oil to a first temperature; (b) preparing a mixture comprising a stabilizer mixture, a petroleum-based fuel and the biosynthetic oil; (c) stirring the mixture; (d) cooling the mixture to a second temperature; (e) permitting the mixture to settle for a predetermined time period to form a product mixture; and (f) filtering the product mixture. In an embodiment, the first temperature is higher than the second temperature. In an embodiment, the method further comprises storing the product mixture.

In an aspect of the invention a fuel composition for diesel engines is provided. The fuel composition comprises at least one petrochemical fuel; at least one biosynthetic oil; and at least one stabilizer mixture. In an embodiment, the percentage, by volume, of the stabilizer mixture is about 0.001% to about 0.5%, and the stabilizer mixture comprises: one or more ketones; one or more alkanes; one or more alcohols; one or more alkenes; one or more aromatic naphtas; one or more nitrates; one or more antioxidants; and one or more polydentate metal deactivators. In an embodiment, the stabilizer mixture comprises a plurality of antioxidants, such as N,N'-di-sec-butyl-p-phenylenediamine, ortho-ter-butylphenol, BHT and BHA. In an embodiment, the stabilizer mixture comprises a plurality of polydentate metal deactivators, such as N,N'-disalicylidene-1,2-cyclohexanediamine and N,N'-disalicylidene-1,2-diaminopropane.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawing(s) of which:

FIG. 2 shows a table having the quality standard for biomass feedstock (biosynthetic oil).

DETAILED DESCRIPTION OF THE INVENTION

Figure 1:
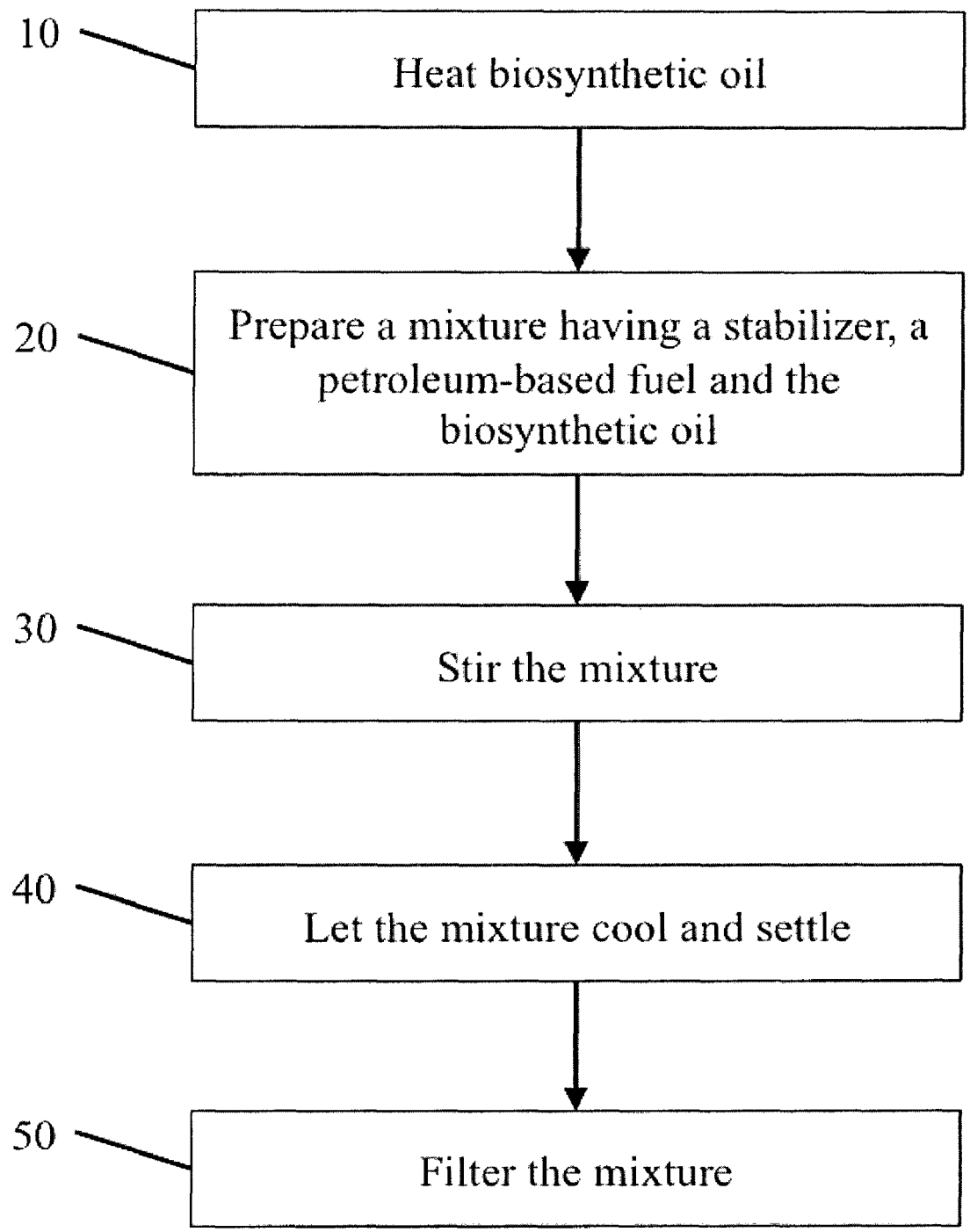
FIG. 1 illustrates a method for preparing hybrid diesel fuel, in accordance with an embodiment of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

The present invention provides fuel compositions and methods of manufacture. Various aspects of the invention described herein can be applied to any of the particular applications set forth below or for any other types of processes for forming fuel. It shall be understood that aspects and embodiments of the invention can be appreciated individually, collectively, or in combination with each other.

In embodiments, fuel compositions are provided having a petrochemical diesel or biodiesel fuel, at least one biosynthetic oil, and a stabilizer. Unless stated otherwise the amounts are expressed as a volume percentage. Examples of petrochemical diesel fuel components include, but are not limited to, Diesel Number 1, Diesel Number 2, and Farm Diesel fuels. Examples of biosynthetic oil component include, but are not limited to, peanut oil, vegetable shortening, cottonseed oil, soy oil, rapeseed oil, canola oil, palm oil, camelina oil, waste vegetable oil, tallow, lard, and yellow grease.

Fuel mixtures formed using biomass feedstock (including biosynthetic oils) provided in various embodiments of the invention, such as biosynthetic oils having material specifications as set forth in FIG. 2, have produced unexpected results. In particular, fuel compositions formed using the biosynthetic oils provided herein have provided for vastly improved oxidative stability of fuel, a fuel that more closely conforms with diesel fuel specifications, a fuel that is compatible with recent model diesel engines and after-treatment exhaust systems, improved diesel engine performance, including increased horsepower, reduced abnormal wear of engines, reduced sulfur emissions and improved combustion. In certain embodiments, fuel mixtures formed using methods and compositions of embodiments of the invention have produced performance results that are not expected from the use of prior art fuel compositions, such as Diesel No. 1 fuel and Diesel No. 2 fuel. In various embodiments, biosynthetic oil specifications are selected so as to achieve optimum engine performance. In an embodiment, biosynthetic oil specifications are selected as provided in FIG. 2. In some embodiments, the biosynthetic oil used to form the fuel mixture is selected so as to achieve a desired (or predetermined) engine performance.

In certain prior art methods and compositions, oil specifications were not provided or considered. In contrast, in various embodiments of the present invention, specific properties of various biosynthetic oils are identified that cause problems when burned in an engine, and cause significant problems when burned in more recent model diesel engines with the more modern exhaust after-treatment systems. Fuels of embodiments of the invention are configured to overcome at least some of these problems.

Biosynthetic oils can naturally contain moderate to high levels of phosphorus (P), which is extremely detrimental to catalytic converters found in after-treatment exhaust systems employed by automobile manufacturers to meet air quality and emissions standards, such as standards set forth by the United States Environmental Protection Agency (EPA) and the California Air Resources Board (CARB). Such standards have imposed stringent phosphorous specifications for unleaded gasoline. In addition, such standards can lead to the scrutiny of biodiesel fuel because many biodiesel fuel producers use fuel grade vegetable oil, which has not been degummed (i.e., processes used for the removal of phosphorous from oil). Along with phosphorous, organic salts, such as calcium (Ca), magnesium (Mg), potassium (K), sodium (Na), and zinc (Zn)—, can be found in oil that has not been "bleached". Such salts are primarily responsible for the carbon deposits that form when either biodiesel or straight vegetable oil (SVO) is used with diesel engines designed to operate using petroleum diesel fuel. These organic salts can have an adverse effect on the oxidative stability of the oil.

In embodiments, better or improved oil stability is achieved by using two separate antioxidants instead of one.

Further, the addition of metal deactivators can greatly improve the stability of the fuel and reduce peroxide formation when biosynthetic oil comes in contact with certain metals. In embodiments, heating requirements during the formation of hybrid fuels provide for the use of lower temperatures, which can assist in the stability of the biosynthetic oil.

In embodiments, it has been observed that as oil heats up, it becomes more susceptible to going rancid or oxidizing. In various embodiments, the maximum heating temperature for oil during the preparation of hybrid diesel fuel is 100° F., or 95° F., or 90° F., or 85° F. This can advantageously reduce the likelihood of oxidation, thereby improving the stability of the oil. In embodiments, by employing a filter press at 0.5 microns, the introduction of deformables or other polymers into the hybrid fuel product and/or the engine of a vehicle once the mixture is allowed to "cure", are minimized, if not eliminated.

In United States Federal law was changed to require that the sulfur content in diesel fuel be less than 15 ppm (parts per million) for on-road ultra-low sulfur diesel (ULSD). An unintended consequence of this change was that treatments used to remove sulfur impurities also decreased lubricity. This difficulty is overcome by the composition and methods of described herein. With the invention's ability to act as a lubricant, diesel engines run more quietly, maintain horsepower, and increase fuel economy because of less frictional loss. In some embodiments, the invention provides a cleaner burning, more efficient, more cost-effective fuel for diesel engines and other applications.

As utilized herein, the term "vegetable oil" can refer to naturally occurring oils that are derived from botanical sources. The vegetable oil can be used directly after collection (straight vegetable oil, SVO), after refining, or after recycling as WVO. The term "animal oil" refers to oils and semisolid oils derived from animal fats and oils. The term "biosynthetic oil" can refer to vegetable or animal oils, or any combination thereof. The term "petroleum" can refer to hydrocarbons obtained from mineral or geological sources. The term "fuel" can signify any fuel that may be used in a diesel engine or burner (such as heating a boiler or furnace).

As utilized herein, the term "diesel fuel" can be any fuel used in diesel engines. Diesel fuel includes, without limitation, fuels that can be utilized for powering compression ignition engines that do not employ spark ignition to initiate internal combustion, and additionally stationary apparatuses that commonly use diesel fuel for a heat source.

The term "biodiesel" can refer to diesel fuels synthesized from animal or vegetable oil sources, by which the native glycerol fatty acid esters are replaced through transesterification with fatty acid esters of low-molecular weight alcohols. Examples of such low-molecular weight alcohols are methanol and ethanol.

The term "hybrid fuel" can indicate some mixture of petroleum, biosynthetic oils, or biodiesel fuels suitable for powering a diesel engine.

Petroleum diesel fuel is a distillate from crude oil obtained by collecting the fraction boiling at atmospheric pressure over an approximate temperature range of about 250° C. to 350° C. The terms "Diesel Number 1" and "Diesel Number 2" can refer to fuels obtained from the lower boiling components and higher boiling components of this fraction, respectively. The term "farm diesel" can refer to lower quality, petroleum diesel fuel, containing higher concentrations of sulfur and used primarily for agriculture. Farm diesel is untaxed, and is also known as red-diesel because of the red dye used to distinguish this fuel from other diesel fuels.

The term "stabilizer" or, equivalently, "stabilizer mixture", can include a combination of one or more components that further modifies or conditions the hybrid fuel to obtain better or improved storage properties or combustion performance. Examples of these fuel properties are, without limitation, lubricity, flow, pour, gelling temperature, emission quality, cetane value, homogeneity, detergent action, microbial growth. An example of a stabilizer mixture includes the composition detailed in Table 1, below.

Biosynthetic Oil

In some embodiments, the fuel compositions of the invention further contain one or more biosynthetic oils. The biosynthetic oil can be WVO or virgin (e.g. unused for any other purpose), or any combination thereof. These individual species can be combined and utilized in any ratio. The biosynthetic oil can be up to 1, 5, 10, 15, 20, 30, 40, 50, 60, 70, 80, 90 or 100% WVO. The biosynthetic oil can be up to 1, 5, 10, 15, 20, 30, 40, 50, 60, 70, 80, 90 or 100% virgin oil. In some embodiments, the biosynthetic oil includes recycled waste oils up to 1, 5, 10, 15, 20, 30, 40, 50, 60, 70, 80, 90 or 100%.

One skilled in the art will recognize that waste cooking oils may contain any of these individual oil components and others in any combination, as a result fat extraction from foodstuffs during frying.

In some embodiments, the fuel compositions of the invention contain a biosynthetic oil component up to about 99.99% by volume. In some embodiments, the fuel compositions of the invention contain a biosynthetic oil component at about 90% by volume. In some embodiments, the fuel compositions of the invention contain a biosynthetic oil component up to about 95% by volume. In some embodiments, the fuel compositions of the invention contain a biosynthetic oil component up to about 97% by volume. In some embodiments, the fuel compositions of the invention contain a biosynthetic oil component up to about 99% by volume.

In some embodiments, the fuel compositions of the invention contain a biosynthetic oil component up to about 10% by volume. In some embodiments, the fuel compositions of the invention contain a biosynthetic oil component up to about 8% by volume. In some embodiments, the fuel compositions of the invention contain a biosynthetic oil component up to about 5% by volume. In some embodiments, the fuel compositions of the invention contain a biosynthetic oil component up to about 3% by volume.

In some embodiments, the fuel compositions of the invention contain a biosynthetic oil component up to about 60% by volume. In some embodiments, the fuel compositions of the invention contain a biosynthetic oil component at about 30% by volume. In some embodiments, the fuel compositions of the invention contain a biosynthetic oil component up to about 40% by volume. In some embodiments, the fuel compositions of the invention contain a biosynthetic oil component up to about 45% by volume. In some embodiments, the fuel compositions of the invention contain a biosynthetic oil component up to about 50% by volume.

Stabilizer Mixture

In some embodiments, the fuel compositions of the invention further contains a stabilizer mixture composed of one or more additives. In some embodiments, the stabilizer mixture contains one or more additives to maintain cetane levels at or above petroleum diesel fuel requirements. In some embodiments, the cetane levels are maintained at a minimum of 35, 36, 37, 38, 39, 40, 41, 42, 43, 44, 45, 46, 47, 48, 49, 50, 51, 52, 53, 54, 55, 57, 58, 59, or 60. In some embodiments, the cetane levels are maintained at a minimum of about 40 to about 55. In some embodiments, the cetane levels are maintained at a minimum of about 45 to about 60. In some embodiments, the cetane levels are maintained at a minimum of about 50 to about 60.

In some embodiments, the stabilizer mixture contains one or more additives that maintain cetane levels at a percentage measured by volume of about 1% to about 40%, about 40% to 90%, or about 90% to about 98%. In some embodiments, the stabilizer mixture contains one or more additives that maintain cetane levels at a percentage measured by volume of about 1% to about 40%. In some embodiments, the stabilizer mixture contains one or more additives that maintain cetane levels at a percentage measured by volume of about 10% to about 40%. In some embodiments, the stabilizer mixture contains one or more additives that maintain cetane levels at a percentage measured by volume of about 14, 15, 16, or 20%. In some embodiments the stabilizer mixture contains one or more additives that maintain cetane levels at a percentage measured by volume of about 14%. In some embodiments, the stabilizer mixture contains one or more additives that maintain cetane levels at a percentage measured by volume of about 60%. An example of one or more additives that maintain cetane levels that can be used in the compositions described herein include, but are not limited to, nitric esters and organic peroxides. Nitric esters can include 2-chloroethylnitrate, 2-ethoxyethylnitrate, isopropylnitrate, butylnitrate, primary amyl nitrate, secondary amyl nitrate, isoamyl nitrate, primary hexyl nitrate, secondary hexyl nitrate, n-heptyl nitrate, n-octyl nitrate, 2-ethylhexyl nitrate, cyclohexyl nitrate, and ethylene glycol dinitrate. These compounds may be used alone or in combination.

In some embodiments, the stabilizer mixture can include one or more additives to clean solids from the fuel system by detergent action. In some embodiments, the stabilizer mixture contains one or more detergents at a percentage measured by volume of about 1% to about 90%. In some embodiments, the stabilizer mixture contains one or more detergents at a percentage measured by volume of about 1% to about 20%, about 21% to about 50%, or about 51% to about 70%. In some embodiments, the stabilizer mixture contains one or more detergents at a percentage measured by volume of about 0.1% to about 9%, about 1% to about 6%, or about 1.1% to about 13%. In some embodiments, the stabilizer mixture contains one or more detergents at a percentage measured by volume of about 1, 5, 6, or 9%. In some embodiments, the stabilizer mixture contains one or more detergents at a percentage measured by volume of about 6%. In some embodiments, the stabilizer mixture can include one or more detergents at a percentage measured by volume of about 9%. Examples of detergents that can be used in the compositions described herein, include but are not limited to, ashless detergents such as imide-based compounds; alkenyl succinimides such as polybutenyl succinimides which are synthesized from polybutenyl succinic acid anhydrides and ethylenepolyamines; succinates such as polybutenyl succinate which are synthesized from a polyalcohol such as pentaerythritol and polybutenyl succinate anhydride; polymers which are obtained by copolymerizing dialkylaminoethylmethacrylate, polyethylene glycol methacrylate, and vinylpyrroridone with alkylmethacrylate; and reaction products of carboxylic acid and amine.

In some embodiments, the stabilizer mixture can include one or more additives to maintain lubrication of the diesel engine components designed to be lubricated by the diesel fuel. In some embodiments, the stabilizer mixture contains one or more lubricants at a percentage measured by volume of about 2% to about 90%. In some embodiments, the stabilizer mixture contains one or more lubricants at a percentage measured by volume of about 2% to about 20%, about 21% to about 50%, or about 51% to about 70%. In some embodiments, the stabilizer mixture contains one or more lubricants at a percentage measured by volume of about 2%. In some embodiments, the stabilizer mixture contains one or more lubricants at a percentage measured by volume of about 5%. In some embodiments, the stabilizer mixture contains one or more lubricants at a percentage (measured by volume) of about 10%. Examples of lubricants that can be used in the compositions described herein include, include but are not limited to, carboxylic acid-, ester-, alcohol- and phenol-based ones which may be used singly or in combination. Examples of carboxylic acid-based lubricants are linoleic acid, oleic acid, salicylic acid, palmitic acid, myristic acid, hexadecenoic acid and mixtures thereof. Examples of ester-based lubricants are carboxylates of glycerin. Carboxylic acids constituting carboxylates are linoleic acid, oleic acid, salicylic acid, palmitic acid, myristic acid, and hexadecenoic acid which may be used singly or in combination.

In some embodiments, the stabilizer mixture can include one or more demulsifiers to separate water from the hybrid fuel. In some embodiments, the stabilizer mixture contains one or more demulsifiers at a percentage measured by volume of about 1% to about 5%, about 9% to about 30%, or about 31% to about 50%. In some embodiments, the stabilizer mixture contains one or more demulsifiers at a percentage measured by volume of about 2%. In some embodiments, the stabilizer mixture contains one or more demulsifiers at a percentage measured by volume of about 5.25%. In some embodiments, the stabilizer mixture contains one or more demulsifiers at a percentage measured by volume of about 8% to about 25%. Examples of demulsifiers that can be used in the compositions described herein include, include but are not limited to, anionic surfactants (e.g., alkyl-naphthalene sulfonates, alkyl benzene sulfonates and the like), nonionic alkoxylated alkylphenol resins, polymers of alkylene oxides (e.g., polyethylene oxide, polypropylene oxide, block copolymers of ethylene oxide, propylene oxide and the like), esters of oil soluble acids, polyoxyethylene sorbitan ester and combinations thereof. In certain embodiments, the demulsifiers for use herein include block copolymers of propylene oxide or ethylene oxide and initiators, such as, for example, glycerol, phenol, formaldehyde resins, soloxanes, polyamines, and polyols. In certain embodiments, the polymers contain about 20 to about 50% ethylene oxide. Low molecular weight materials, such as, for example, alkali metal or alkaline earth metal salts of dialkylnaphthalene sulfonic acids, are also useful in certain applications.

In some embodiments, the stabilizer mixture can include one or more anti-gelling agents. In some embodiments, the fuel compositions of the invention prevent gelling at temperatures below 40, 35, 33, 32, 30, 29, 28, 27, 26, 25, 24, 23, 22, 20, 18, 16, 15, 12, 13, 10, 5, 4, 3, 2, or 1 degree Fahrenheit. In some embodiments, the fuel compositions of the invention prevent gelling at temperatures below 0 degrees Fahrenheit. In some embodiments, the fuel compositions of the invention prevent gelling at temperatures below −1, −2, −5, −10, −15, −20, −30, −40, −50, −60, −70 or −80 degrees Fahrenheit. In some embodiments, the stabilizer mixture contains one or more anti-gelling agents at a percentage measured by volume of about 1% to about 9%, about 15% to about 30%, or about 31% to about 50%. In some embodiments, the stabilizer mixture contains one or more anti-gelling agents at a percentage measured by volume of about 2%. In some embodiments, the stabilizer mixture contains one or more anti-gelling agents at a percentage measured by volume of about 5%. In some embodiments, the stabilizer mixture contains one or more anti-gelling agents at a percentage measured by volume of 9%. In some embodiments, the stabilizer mixture contains one or more anti-gelling agents at a percentage measured by volume of 15%. In some embodiments, the stabilizer mixture contains one or more anti-gelling agents at a percentage measured by volume of 20%. Examples of anti-gelling agents that can be used in the compositions described herein include, but are not limited to, methanol, n-propanol, isopropanol, polyalkyl methacrylate, polystyrene methacrylate, polymethacrylates, polymers, dispersants, wax modifiers, alcohols, and/or 2-butoxyethanol.

In some embodiments, the fuel compositions provided herein can function as a biocide to control microbial growth. In some embodiments, one or more biocides are added to the stabilizer mixture. Some examples of fuel biocides include thiazoles, thiocyanates, isothiazolins, cyanobutane, dithiocarbamate, thione, and bromo-compounds. Surfactants and water-scavengers are also useful for preventing and curing biocontamination. In some embodiments the fuel compositions described herein comprises at least one of the following biocides: thiazoles, thiocyanates, isothiazolins, cyanobutane, dithiocarbamate, thione, bromo-compounds, ONDEO-NALCO 303MC™, and 1,2,4-trimethylbenzene.

In some embodiments, the stabilizer mixture is composed of one or more additives to maintain cetane levels at or above petroleum diesel fuel requirements, one or more additives to clean solids from the fuel system by detergent action, one or more additives to maintain lubrication of the diesel engine components designed to be lubricated by the diesel fuel, one or more demulsifiers to separate water from the hybrid fuel, and one or more anti-gelling agents. In some embodiments, the stabilizer mixture can comprise, by volume, about 2% to about 40% of one or more cetane enhancers, about 9% to about 60% of one or more demulsifiers, about 1% to about 70% of one or more detergents and about 1% to about 5% of one or more antigellants. In some embodiments, the stabilizer mixture can comprise, by volume, about 2% to 40% of one or more cetane enhancers, about 1% to about 5% of one or more demulsifiers, about 1% to 70% of one or more detergents and about 1% to 9% of one or more antigellants. In some embodiments, the stabilizer mixture can comprise, by volume, about 2% to about 40% of one or more cetane enhancers, about 9% to about 60% of one or more demulsifiers, about 1% to about 70% of one or more detergents and about 15% to about 50% of one or more antigellants. In some embodiments, the stabilizer mixture can comprise, by volume, about 2% to about 40% of one or more cetane enhancers, about 1% to about 5% of one or more demulsifiers, about 1% to about 70% of one or more detergents and about 15% to about 50% of one or more antigellants.

In some embodiments, the stabilizer mixture can include cetane enhancers, demulsifiers, detergent, lubricants, antioxidants, metal deactivators and antigellants. In some embodiments, the stabilizer mixture comprises, by volume, about 2% to about 30% of one or more cetane enhancers, about 1% to about 5% of one or more antigellants, about 1% to about 3% polydentate metal deactivators, about 1% to about 30% antioxidants, about 1% to about 5% oil/diesel bonder, about 1% to about 20% M.I.U./paraffin bonder, about 1% to about 10% carbon reducer, about 1% to about 10% soap/glycerin releasing agent, about 1% to about 30% stabilizer.

In some embodiments, the stabilizer mixture comprises, by volume: acetone, about 2% to about 7%; 3-butyl-3-methylnitrate propane, about 32% to 55%; sorbitan mono-9-octadecenol, about 1% to about 6%; sorbitan tri-9-octadecenol, about 1% to 6%; 1-hydroxy-3,6-dioxaoctane, about 0.1% to 6%; long-chain alkyl benzenes, about 8% to 19%; 2-butoxyethanol, about 4% to 13%; 2-butylbutanol, about 0.25% to 5%; heavy aromatic naphthas, about 4% to 17%; 1-methylbenzene, about 0.3% to 6%; dimethyl benzenes, zero up to about 13%; methyldipropylene glycol, about 11% to 24%; methyldipropylene propanol, less than about 1% to 26%; alkylalkyloxy alkanol, about 0.1% to about 24%; 2-ethylhexl nitrate, about 18% to 45%; octyl nitrate, about 2% to 15%; xlene heptane, about 5% to 15%; 2-ethylhexanol, less than about 1% to about 3%; antioxidants, such as N,N'-di-sec-butyl-p-phenylenediamine, ortho-ter-butylphenol, BHT and BHA, about 1% to 5%; polydentate metal deactivator(s), such as N,N'-disalicylidene-1,2-cyclohexanediamine and N,N'-disalicylidene-1,2-diaminopropane, less than about 1%. In an embodiment, the stabilizer mixture comprises one or more antioxidants. In an embodiment, the stabilizer mixture comprises one or more metal deactivators, such as, e.g., polydentate metal deactivators.

In some embodiments, the stabilizer mixture contains the components shown in Table 1:

TABLE 1

| Component | (v/v %) |
|---|---|
| acetone | about 2% to about 7% |
| 3-butyl-3-methylnitrate propane | about 32% to about 55% |
| sorbitan mono-9-octadecenol | about 1% to about 6% |
| sorbitan tri-9-octadecenol | about 1% to about 6% |
| 1-hydroxy-3,6-dioxaoctane | about 0.1% to about 9% |
| long-chain alkyl benzenes | about 8% to about 19% |
| 2-butoxyethanol | about 4% to about 13% |
| 2-butylbutanol | about 0.25% to about 5% |
| heavy aromatic naphthas | about 4% to about 17% |
| 1-methylbenzene | about 0.3% to about 6% |
| dimethyl benzenes | zero up to about 13% |
| methyldipropylene glycol | about 11% to about 24% |
| methyldipropylene propanol | less than about 1% to about 26% |
| alkylalkyloxy alkanol | about 0.1% to about 24% |
| 2-ethylhexl nitrate | about 18% to about 45% |
| octyl nitrate | about 2% to about 15% |
| xlene heptane | about 5% to about 15% |
| 2-ethylhexanol | less than about 1% to about 3% |
| BHT and/or BHA | about 1% to about 5% |
| N,N'-di-sec-butyl-p-phenylenediamine | about 1% to about 5% |
| ortho-ter-butylphenol | about 1% to about 5% |
| N,N'-disalicylidene-1,2-cyclohexanediamine | less than about 1% |
| N,N'-disalicylidene-1,2-diaminopropane | less than about 1% |

In Table 1, "Heavy Aromatic Solvent Naphtha" is that naptha fraction boiling over a range of 140 degree F. to 240 degree F. (60° C. to 116° C.).

One skilled in the art will recognize that small levels of unidentified chemical impurities will naturally be present in the materials listed in Table 1, and that the impurities will not significantly affect the function of the mixture.

In some embodiments, the fuel compositions of the invention contain a stabilizer from about 0.01% to about 0.25% by volume. In some embodiments, the fuel compositions of the invention contain a stabilizer from about 0.01% by volume. In some embodiments, the fuel compositions of the invention contain a stabilizer from about 0.05% by volume. In some embodiments, the fuel compositions of the invention contain a stabilizer from about 0.07% by volume. In some embodiments, the fuel compositions of the invention contain a stabilizer from about 0.08% by volume. In some embodiments, the fuel compositions of the invention contain a stabilizer from about 0.1% by volume. In some embodiments, the fuel compositions of the invention contain a stabilizer from about 0.18% by volume. In some embodiments, the fuel compositions of the invention contain a stabilizer from about 0.19% by volume. In some embodiments, the fuel compositions of the invention contain a stabilizer from about 0.20% by volume. In some embodiments, the fuel compositions of the invention contain a stabilizer from about 0.25% by volume.

In some embodiments, the fuel compositions of the invention contain the stabilizer mixture of table 1 from about 0.01% to about 0.25% by volume. In some embodiments, the fuel compositions of the invention contain the stabilizer mixture of table 1 from about 0.01% by volume. In some embodiments, the fuel compositions of the invention contain the stabilizer mixture of table 1 from about 0.05% by volume. In some embodiments, the fuel compositions of the invention contain the stabilizer mixture of table 1 from about 0.07% by volume. In some embodiments, the fuel compositions of the invention contain the stabilizer mixture of table 1 from about 0.08% by volume. In some embodiments, the fuel compositions of the invention contain the stabilizer mixture of table 1 from about 0.1% by volume. In some embodiments, the fuel compositions of the invention contain the stabilizer mixture of table 1 from about 0.18% by volume. In some embodiments, the fuel compositions of the invention contain the stabilizer mixture of table 1 from about 0.19% by volume. In some embodiments, the fuel compositions of the invention contain the stabilizer mixture of table 1 from about 0.20% by volume. In some embodiments, the fuel compositions of the invention contain the stabilizer mixture of table 1 from about 0.25% by volume.

Petrochemical or Biochemical Fuel

In some embodiments, the fuel compositions of the invention contain a petrochemical or biochemical fuel. In some embodiments, the petrochemical or biochemical fuel is a diesel fuel. Any diesel fuel that meets the requirements set forth in ASTM procedure D975 can be used in the compositions and methods described herein. The diesel fuel can be a hydrocarbon fuel to include middle distillate fuels obtained from the refining of a petroleum or mineral oil source and fuels from a synthetic process such as a Fischer-Tropsch fuel from a Fischer-Tropsch process. Middle distillate fuels generally have a distillation temperature range of 121 to 371° C., which is greater than that of gasoline or naphtha with some overlap. Middle distillate fuels include distillation fractions for diesel, jet, heating oil, gas oil, and kerosene. The diesel can be Diesel Number 1, Diesel Number 2 or a combination thereof. The diesel can be farm diesel.

In some embodiments, petrochemical or biochemical fuel can be a biodiesel fuel. Biodiesel fuels can be derived from animal fats and/or vegetable oils. Biodiesel fuels can be derived from biomass sources such as plant seeds. Biodiesel fuels include esters of naturally occurring fatty acids such as the methyl ester of rapeseed oil which can generally be prepared by transesterifying a triglyceride of a natural fat or oil with an aliphatic alcohol having 1 to 10 carbon atoms.

In an embodiment of the invention the petrochemical or biochemical fuel comprises a middle distillate fuel, a Fischer-Tropsch fuel, a biodiesel fuel, or mixtures thereof. In an embodiment of the invention the petrochemical or biochemical fuel comprises be Diesel Number 1, Diesel Number 2 or a combination thereof. A mixture can be, for example, a mixture of one or more distillate fuels and one or more biodiesel fuels or a mixture of two or more biodiesel fuels. Middle distillate fuels generally contain aromatic hydrocarbons, which tend to be a source of atmospheric pollution. Middle distillate fuels can contain very high levels of aromatic hydrocarbons near 85% by volume or very low levels of aromatic hydrocarbons near 3% by volume when highly refined to meet environmental regulations; and in other instances can contain aromatic hydrocarbons from about 3 to about 60% by volume or from about 3 to about 40% by volume. The petrochemical or biochemical fuel component can be present in the fuel composition of the present invention at about 50 or 55 to about 99% by volume; and in other instances at about 60 to about 97% by volume, at about 65 to about 95% by volume, at about 70 to about 99% by volume, or at about 87 to about 95% by volume.

In some embodiments, the fuel compositions of the invention contain a petrochemical or biochemical fuel component at a percentage measured by volume of greater than zero and less than 100%. In some embodiments, the fuel compositions of the invention contain a petrochemical or biochemical fuel component at a percentage measured by volume of less than 10, 9, 8, 7, 6, 5, 4, 3, 2, 1, 0.5, or 0.1%. In some embodiments, the fuel compositions of the invention contain a petrochemical or biochemical fuel at about 10%. In some embodiments, the fuel compositions of the invention contain a petrochemical or biochemical fuel at about 5%. In some embodiments, the fuel compositions of the invention contain a petrochemical or biochemical fuel at about 3%. In some embodiments, the fuel compositions of the invention contain a petrochemical or biochemical fuel at about 1%. In some embodiments, the fuel compositions of the invention contain a petrochemical or biochemical fuel at about 0.5%.

In some embodiments, the fuel compositions of the invention contain a petrochemical or biochemical fuel component at a percentage measured by volume of about 70, 75, 80, 85, 90, 91, 92, 93, or 95%. In some embodiments, the fuel compositions of the invention contain a petrochemical or biochemical fuel at about 80%. In some embodiments, the fuel compositions of the invention contain a petrochemical or biochemical fuel at about 85%. In some embodiments, the fuel compositions of the invention contain a petrochemical or biochemical fuel at about 90%. In some embodiments, the fuel compositions of the invention contain a petrochemical or biochemical fuel at about 95%. In some embodiments, the fuel compositions of the invention contain a petrochemical or biochemical fuel at about 98%.

In some embodiments, the fuel compositions of the invention contain a petrochemical or biochemical fuel component at a percentage measured by volume of about 30, 35, 40, 45, 50, 55, 58, 59, or 60%. In some embodiments, the fuel compositions of the invention contain a petrochemical or biochemical fuel at about 30%. In some embodiments, the fuel compositions of the invention contain a petrochemical or biochemical fuel at about 40%. In some embodiments, the fuel compositions of the invention contain a petrochemical or biochemical fuel at about 50%. In some embodiments, the fuel compositions of the invention contain a petrochemical or biochemical fuel at about 55%. In some embodiments, the fuel compositions of the invention contain a petrochemical or biochemical fuel at about 60%.

Hybrid Fuel Mixture

In some embodiments, the invention provides a fuel composition containing at least one petrochemical fuel, at least one biosynthetic oil, and at least one stabilizer mixture, where the percentage by volume of said petrochemical fuel is greater than 0 and less than 100%, and where the percentage by volume of said stabilizer mixture is about 0.001% to about 1.0%. In some embodiments, the invention provides a fuel composition containing at least one petrochemical fuel, at least one biosynthetic oil, and at least one stabilizer mixture, where the percentage by volume of said petrochemical fuel is about 90 to about 98%, and where the percentage by volume of said stabilizer mixture is about 0.001% to about 1.0%. In some embodiments, the invention provides a fuel composition containing at least one petrochemical fuel, at least one biosynthetic oil, and at least one stabilizer mixture, where the percentage by volume of said petrochemical fuel is about 70 to about 89%, and where the percentage by volume of said stabilizer mixture is about 0.001% to about 1.0%. In some embodiments, the invention provides a fuel composition containing at least one petrochemical fuel, at least one biosynthetic oil, and at least one stabilizer mixture, where the percentage by volume of said petrochemical fuel is about 40 to about 60%, and where the percentage by volume of said stabilizer mixture is about 0.001% to about 1.0%. In some embodiments, the fuel composition meets quality standards ASTM D975, ASTM D 7467 and ASTM D6751. In some embodiments, the biosynthetic oil is up to 99.99% by volume of the fuel composition. In some embodiments, the stabilizer mixture is the stabilizer mixture described in table 1.

In some embodiments, the invention provides a fuel composition containing greater than zero and less than 100% volume of at least one petroleum fuel, up to 99.9% volume of at least one biosynthetic oil, and about 0.001% to 1.0% by volume of a stabilizer mixture configured to enable the fuel composition to reach the same or higher lubricity, pour rate, and flow rate as Diesel Number 2 fuel. In some embodiments, the invention provides a fuel composition containing about 90 to about 98% of at least one petrochemical fuel, about 2 to about 10% of at least one biosynthetic oil, and about 0.001% to about 1.0% of at least one stabilizer mixture configured to enable the fuel composition to reach the same or higher lubricity, pour rate, and flow rate as Diesel Number 2 fuel. In some embodiments, the invention provides a fuel composition containing about 70 to about 89% of at least one petrochemical fuel, about 11 to about 30% of at least one biosynthetic oil, and about 0.001% to about 1.0% of at least one stabilizer mixture configured to enable the fuel composition to reach the same or higher lubricity, pour rate, and flow rate as Diesel Number 2 fuel. In some embodiments, the invention provides a fuel composition containing about 40 to about 60% of at least one petrochemical fuel, about 40 to about 60% of at least one biosynthetic oil, and about 0.001% to about 1.0% of at least one stabilizer mixture configured to enable the fuel composition to reach the same or higher lubricity, pour rate, and flow rate as Diesel Number 2 fuel. In some embodiments, the stabilizer mixture is the stabilizer mixture described in table 1.

Other known fuel additives may be added alone or in combination to the fuel compositions described herein. Such additives include cold flow improvers such as ethylene-vinyl acetate copolymers and alkenyl succinimide, phenol- or amine-based oxidation inhibitors, metal deactivators such as salicyliden derivatives, antiicing agents such as polyglycol ether, corrosion inhibitors such as fatty amines and alkenyl succinates, antistatic additives such as anionic-, cationic- and amphoteric-surfactants, dyes such as azo dyes, and silicone-based anti-foam additives.

In some embodiments, the fuel compositions of the invention have an increased fuel economy of 3, 4, 5, 6, 7, 8, 10, 20, 25, 35, 45, or 50% when compared to Diesel 1 or Diesel 2. In some embodiments, the fuel compositions of the invention have an increased fuel economy of 5% when compared to Diesel 1 or Diesel 2. In some embodiments, the fuel compositions of the invention have an increased fuel economy of 10% when compared to Diesel 1 or Diesel 2. In some embodiments, the fuel compositions of the invention have an increased fuel economy of 15% when compared to Diesel 1 or Diesel 2. In some embodiments, the fuel compositions of the invention have an increased fuel economy of 20% when compared to Diesel 1 or Diesel 2. In some embodiments, the fuel compositions of the invention have an increased fuel economy of 30% when compared to Diesel 1 or Diesel 2.

In some embodiments, the fuel compositions of the invention have a reduction in hydrocarbon emissions of 50, 60, 65, 70, 80, 90, 95, 99, or 100% compared to Diesel 1 or Diesel 2. In some embodiments, the fuel compositions of the invention have a reduction in hydrocarbon emissions of over 60, 65, 70, 80, 90, 95, or 99% compared to Diesel 1 or Diesel 2. In some embodiments, the fuel compositions of the invention have a reduction in hydrocarbon emissions of 65% compared to Diesel 1 or Diesel 2. In some embodiments, the fuel compositions of the invention have a reduction in hydrocarbon emissions of 70% compared to Diesel 1 or Diesel 2. In some embodiments, the fuel compositions of the invention have a reduction in hydrocarbon emissions of 80% compared to Diesel 1 or Diesel 2. In some embodiments, the fuel compositions of the invention have a reduction in hydrocarbon emissions of 90% compared to Diesel 1 or Diesel 2. In some embodiments, the fuel compositions of the invention have a reduction in hydrocarbon emissions of 95% compared to Diesel 1 or Diesel 2. In some embodiments, the fuel compositions of the invention have a reduction in hydrocarbon emissions of 99% compared to Diesel 1 or Diesel 2.

In some embodiments, the fuel compositions of the invention emit less sulfur gases when compared to Diesel 1 or Diesel 2. In some embodiments, the fuel compositions of the invention emit less than 300 parts per million SOx. In some embodiments, the fuel compositions of the invention emit less than 200 parts per million SOx. In some embodiments, the fuel compositions of the invention emit less than 100 parts per million SOx. In some embodiments, the fuel compositions of the invention emit less than 50 parts per million SOx. In some embodiments, the fuel compositions of the invention emit less than 30 parts per million SOx. In some embodiments, the fuel compositions of the invention emit less than 15 parts per million SOx. In some embodiments, the fuel compositions of the invention emit less than 10 parts per million SOx. In some embodiments, the fuel compositions of the invention emit less than 5 parts per million SOx.

In an aspect of the invention, methods for forming hybrid fuel mixtures are provided. With reference to FIG. 1, in an embodiment, biosynthetic oil meeting certain specifications (see FIG. 2) is provided for forming the hybrid fuel mixture. In step 10, the biosynthetic oil is heated. Next, in step 20, a mixture is prepared comprising a stabilizer mixture at about 0.25% (v/v) of biosynthetic feedstock, a petroleum-based fuel (e.g., Diesel #1, Diesel #2, farm diesel), and the biosynthetic oil. Next, in step 30, the mixture is stirred using a static mixer, or equivalent, to ensure that no air (or other gases) is mixed into the mixture. Next, in step 40, once the components are mixed, the mixture is cooled. In an embodiment, the mixture is cooled to a temperature below the temperature used in step 10. The mixture is then allowed to sit (or settle) for a certain time period. Next, in step 50, the product mixture is filtered. The hybrid fuel is then ready for use (e.g., storage, distribution).

EXAMPLES

Example 1

Method of Preparation of the Invention

A hybrid fuel mixture can be prepared using methods and compositions of embodiments of the invention, such as the method shown in FIG. 1. Virgin or waste biosynthetic oil meeting the specifications set forth in FIG. 2 was used to prepare a hybrid fuel. Next, biosynthetic oil was heated to a maximum temperature of about 85° F. Next, a mixture was prepared comprising a stabilizer mixture at about 0.25% (v/v) of biosynthetic feedstock, a petroleum-based fuel (e.g., Diesel #1, Diesel #2, farm diesel), and the biosynthetic oil. Next, the mixture was prepared or stirred using a static mixer, or equivalent, to ensure that no air was mixed into the mixture. At all times, the introduction of oxygen and water into the mixture was avoided. Once the components were mixed, the mixture was cooled to a temperature of about 60° F. and allowed to sit (or settle) for at least about 4 hours. Next, the product mixture was filtered through a filter having 0.50 micron absolute media (filter press most desirable). At this point, the hybrid fuel was ready for storage, distribution, or use. At all times, yellow metals, galvanized metals, and bare iron steel were avoided. For storage purposes, fiberglass or fiberglass-lined tanks were used, and the tanks were capped with an inert gas blanket. Because the product can create static charge, all equipment was bonded and grounded.

Example 2

Compositions

For one example of one of the embodiments of the invention (Composition A), 0.7 gallons of stabilizer mixture are added to a total of 7000 gallons (26,500 liter) of a fuel pre-mixture of 70% WVO and 30% Diesel Number 2 to give a final stabilizer concentration of 0.01%, v/v. A typical batch size is 7000 gallons. One experienced in the art will realize that the amount of stabilizer varies depending on the viscosity of the filtered oil; the thinner and cleaner the biosynthetic oil, the less stabilizer is needed.

For another example (Composition B), 17.5 gallons (0.25%, v/v) of stabilizer mixture are added to a total of 7000 gallons of a fuel pre-mixture of 70% beef tallow and 30% Diesel Number 2. Because the pre-mixture is more viscous than one formulated with WVO, an additional amount of the stabilizer is required.

The following additional examples illustrate, on a volume basis, other useful compositions of the invention suited for different fueling applications and environmental conditions. The following examples of compositions are based on a total pre-mixture volume of 7000 gallons (26,500 liters):

Composition C, for winter, on or off road driving conditions: (25% WVO+25% beef tallow+45% Diesel Number 2+5% Diesel Number 1)+17.5 gallons of stabilizer mixture (0.25% v/v).

Composition D, for on or off road driving conditions: (55% Tallow+45% Diesel Number 2)+17.5 gallons of stabilizer mixture (0.25% v/v).

Composition E, for summer, on or off road conditions: (55% WVO+45% Diesel #2)+17.5 gallons of stabilizer mixture (0.25% v/v)

Composition F, for on or off road driving conditions: (70% WVO+30% Diesel #2)+17.5 gals of stabilizer mixture (0.25% v/v).

Composition G, for on or off road driving conditions: (20% WVO (or other biomass feedstock)+80% Diesel #2)+17.5 gals of stabilizer mixture (0.25% v/v)

Composition H, for on or off road driving conditions: (10% WVO (or other biomass feedstock)+90% Diesel #2)+17.5 gals of stabilizer mixture (0.25% v/v).

Composition I, for on or off road driving conditions: (5% WVO (or other biomass feedstock)+95% Diesel fuel #2)+ 17.5 gals of stabilizer mixture (0.25% v/v)

Fuel compositions of embodiments of the invention are configured to provide for improved diesel engine performance. In an embodiment, fuel compositions of various embodiments of the invention are configured to prevent the loss of horsepower and torque of a diesel (or diesel fuel) engine compared to Diesel Number 1 fuel or Diesel Number 2 fuel. In another embodiment, fuel compositions of various embodiments of the invention are configured to prevent abnormal wear of engines compared to Diesel Number 1 fuel or Diesel Number 2 fuel. In still another embodiment, fuel compositions of various embodiments of the invention are configured to reduce sulfur emissions of diesel engines compared to Diesel Number 1 fuel or Diesel Number 2 fuel. In still another embodiment, fuel compositions of various embodiments can provide for improved combustion in diesel engines compared to Diesel Number 1 fuel or Diesel Number 2 fuel.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A fuel composition for diesel engines comprising:
at least one petrochemical fuel;
at least one biosynthetic oil; and
at least one stabilizer mixture,
wherein the percentage of the at least one stabilizer mixture is about 0.001% to about 0.5% by volume, and wherein the at least one stabilizer mixture comprises: acetone; 3-butyl-3-methylnitrate propane; sorbitan mono-9-octadecenol; sorbitan tri-9-octadecenol; 1-hydroxy-3,6-dioxaoctane; 2 butoxyethanol; 2-butylbutanol; heavy aromatic naphthas; 1-methylbenzene; dimethyl benzenes; methyldipropylene glycol; methyldipropylene propanol; alkylalkyloxy alkanol; 2-ethylhexl nitrate; octyl nitrate; 2 ethylhexanol; antioxidants; and polydentate metal deactivators.

2. The fuel composition of claim 1, wherein the biosynthetic oil is selected from the group consisting of peanut oil, vegetable shortening, cottonseed oil, soy oil, rapeseed oil, canola oil, palm oil, waste vegetable oil, tallow, lard, yellow grease, brown grease, jatropha oil, copra oil, coconut oil and camelina oil.

3. The fuel composition of claim 1, wherein the petrochemical fuel is selected from the group consisting of Diesel Number 1, Diesel Number 2, and Farm Diesel.

4. The fuel composition of claim 1, wherein the biosynthetic oil is up to 99.99% by volume of the fuel composition.

5. The fuel composition of claim 1, where the stabilizer mixture further comprises by volume about 2% to about 40% of one or more cetane enhancers, about 9% to about 60% of one or more demulsifiers, about 1% to about 70% of one or more detergents, and about 1% to about 5% of one or more antigellants.

6. The fuel composition of claim 1, wherein the stabilizer mixture comprises, by volume: acetone, about 2% to about 7%; 3-butyl-3-methylnitrate propane, about 32% to 55%; sorbitan mono-9-octadecenol, about 1% to about 6%; sorbitan tri-9-octadecenol, about 1% to 6%; 1-hydroxy-3,6-dioxaoctane, about 0.1% to 9%; 2 butoxyethanol, about 4% to 13%; 2-butylbutanol, about 0.25% to 5%; heavy aromatic naphthas, about 4% to 17%; 1-methylbenzene, about 0.3% to 6%; dimethyl benzenes, zero up to about 13%; methyldipropylene glycol, about 11% to 24%; methyldipropylene propanol, less than about 1% to 26%; alkylalkyloxy alkanol, about 0.1% to about 24%; 2-ethylhexl nitrate, about 18% to 45%; octyl nitrate, about 2% to 15%; 2 ethylhexanol, less than about 1% to about 3%; antioxidants, about 1% to 5%; polydentate metal deactivators, less than about 1%.

7. The fuel composition of claim 6, wherein the antioxidants include one or more of N,N'-di-sec-butyl-p-phenylenediamine, ortho-ter-butylphenol, BHT and BHA.

8. The fuel composition of claim 6, wherein the polydentate metal deactivators include one or more of N,N'-disalicylidene-1,2-cyclohexanediamine and N,N'-disalicylidene-1,2-diaminopropane.

9. The fuel composition of claim 1, wherein the fuel composition, upon combustion of said fuel composition in a diesel engine, prevents the loss of horse power and torque of said diesel engine compared to Diesel Number 1 fuel or Diesel Number 2 fuel.

10. The fuel composition of claim 1, wherein the fuel composition, upon combustion of said fuel composition in a diesel engine, prevents abnormal wear to said engine compared to Diesel Number 1 fuel or Diesel Number 2 fuel.

11. The fuel composition of claim 1, wherein the fuel composition, upon combustion of said fuel composition in a diesel engine, reduces sulfur emissions of said diesel compared to Diesel Number 1 fuel or Diesel Number 2 fuel.

12. The fuel composition of claim 1, wherein the biosynthetic oil comprises at least one recycled vegetable oil.

13. The fuel composition of claim 1, wherein the biosynthetic oil comprises at least one recycled animal oil.

14. The fuel composition of claim 1, wherein the biosynthetic oil comprises virgin oil.

15. The fuel composition of claim 1, wherein the fuel composition, upon combustion of said fuel composition in a diesel engine, lubricates said diesel engine and various working parts of the diesel engine equally or better than another diesel engine and various working parts of the another diesel engine lubricated with Diesel Number 1 fuel or Diesel Number 2 fuel.

16. The fuel composition of claim 1, wherein the components of the stabilizer mixture comprises components selected from the group consisting of: at least one additive that, upon combustion of said fuel composition, maintains cetane levels at or above petroleum fuel requirements for Diesel Number 2 fuel; at least one additive that, upon combustion of said fuel composition fuel, maintains and cleans oil solids from injectors and fuel systems; at least one additive that, upon combustion of said fuel composition, maintains lubrication of internal combustion engines and their parts; at least one additive that, upon combustion of said fuel composition fuel, removes or separates water from said at least one fuel and said fuel composition; at least one additive that, upon combustion of said fuel composition, prevents gelling of said fuel composition; and at least one additive that, upon combustion of said fuel composition, prevents oxidation of said fuel composition.

17. The fuel composition of claim 1, wherein the stabilizer mixture comprises at least one additive that, upon combustion of said fuel composition, prevents the oxidation of the fuel composition.

18. The fuel composition of claim 1, further comprising:
greater than about zero and less than 100% by volume of at least one petroleum fuel;
up to about 99.9% by volume of at least one biosynthetic oil; and
about 0.001% to 0.5% by volume of a stabilizer mixture that,
upon combustion of said fuel composition, enables the fuel composition to reach the same or higher lubricity, pour rate, and/or flow rate as Diesel Number 1 fuel or Diesel Number 2 fuel.

19. The fuel composition of claim 18, wherein the biosynthetic oil is selected from the group consisting of peanut oil, vegetable shortening, cottonseed oil, soy oil, rapeseed oil, canola oil, palm oil, waste vegetable oil, brown grease, jatropha oil, copra oil, coconut oil, camelina oil, tallow, lard, and yellow grease.

20. The fuel composition of claim 18, wherein the petrochemical fuel is selected from the group consisting of Diesel Number 1, Diesel Number 2 and Farm Diesel.

21. The fuel composition of claim 18, wherein the stabilizer mixture further comprises, by volume, about 2% to about 40% of one or more cetane enhancers, about 9% to about 60% of one or more demulsifiers, about 1% to about 70% of one or more detergents, and about 1% to about 5% of one or more antigellants.

22. The fuel composition of claim 18, wherein the stabilizer mixture comprises, by volume: acetone, about 2% to about 7%; 3-butyl-3-methylnitrate propane, about 32% to 55%; sorbitan mono-9-octadecenol, about 1% to about 6%; sorbitan tri-9-octadecenol, about 1% to 6%; 1-hydroxy-3,6-dioxaoctane, about 0.1% to 9%; 2 butoxyethanol, about 4% to 13%; 2-butylbutanol, about 0.25% to 5%; heavy aromatic naphthas, about 4% to 17%; 1-methylbenzene, about 0.3% to 6%; dimethyl benzenes, zero up to about 13%; methyldipropylene glycol, about 11% to 24%; methyldipropylene propanol, less than about 1% to 26%; alkylalkyloxy alkanol, about 0.1% to about 24%; 2-ethylhexl nitrate, about 18% to 45%; octyl nitrate, about 2% to 15%; 2 ethylhexanol, less than about 1% to about 3%; antioxidants selected from the group consisting of N,N'-di-sec-butyl-p-phenylenediamine, ortho-ter-butylphenol, BHT and BHA, about 1% to 5%; polydentate metal deactivator(s) selected from the group consisting of N,N'-disalicylidene-1,2-cyclohexanediamine and N,N'-disalicylidene-1,2-diaminopropane, less than about 1%.

23. The fuel composition of claim 1, wherein the polydentate metal deactivators include one or more of N,N'-disalicylidene-1,2-cyclohexanediamine and N,N'-disalicylidene-1,2-diaminopropane.

24. The fuel composition of claim 1, wherein the antioxidants include one or more of N,N'-di-sec-butyl-p-phenylenediamine, ortho-ter-butylphenol, BHT and BHA.

* * * * *